(12) United States Patent
Qin et al.

(10) Patent No.: US 7,859,164 B2
(45) Date of Patent: Dec. 28, 2010

(54) ARMATURE LAMINATIONS

(75) Inventors: Ray Qin, Hong Kong (CN); Jiyu Liang, Shenzhen (CN)

(73) Assignee: Johnson Electric S.A., La Chaux-De-Fonds (CH)

( * ) Notice: Subject to any disclaimer, the term of this patent is extended or adjusted under 35 U.S.C. 154(b) by 294 days.

(21) Appl. No.: 12/076,206

(22) Filed: Mar. 14, 2008

(65) Prior Publication Data
US 2008/0224562 A1 Sep. 18, 2008

(30) Foreign Application Priority Data
Mar. 16, 2007 (CN) .................. 2007 1 0088612

(51) Int. Cl.
H02K 1/16 (2006.01)
(52) U.S. Cl. .................. 310/216.071; 310/216.069
(58) Field of Classification Search .......... 310/216.059, 310/69, 71–73, 96, 97, 269
See application file for complete search history.

(56) References Cited

U.S. PATENT DOCUMENTS

| 3,842,300 | A | * | 10/1974 | Daykin et al. | ......... | 310/216.004 |
| 4,088,177 | A | * | 5/1978 | Armstrong et al. | .......... | 164/109 |
| 4,334,163 | A | * | 6/1982 | Ascoli | ......... | 310/90 |
| 5,449,963 | A | * | 9/1995 | Mok | ......... | 310/270 |

2005/0029894 A1 * 2/2005 Egawa et al. ................ 310/216

FOREIGN PATENT DOCUMENTS

| DE | 202006002279 | | 4/2006 |
| EP | 1093208 | B1 | 8/2006 |
| GB | 1460198 | A | 12/1976 |
| JP | 59047954 | | 3/1984 |
| JP | 2001025182 | | 1/2001 |
| JP | 2001-103693 | A | 4/2001 |
| JP | 2001-298917 | A | 10/2001 |

OTHER PUBLICATIONS

Zho et al., "Influence of Design Prameters on Cogging Torque in Permanent Magnet Machines" IEEE Transactions of Energy Conversion, 2000, vol. 15, No. 4.

* cited by examiner

*Primary Examiner*—Quyen Leung
*Assistant Examiner*—Naishadh N Desai
(74) *Attorney, Agent, or Firm*—Birch, Stewart, Kolasch & Birch, LLP

(57) ABSTRACT

A DC motor, has a stator housing accommodating a permanent magnet stator; a rotor, rotatably mounted confronting the stator, the rotor having a shaft, a rotor core fitted to the shaft and having asymmetric laminations, a commutator fitted to the shaft adjacent one end of the rotor core, and windings wound about poles of the rotor core and terminated on the commutator; and brush gear comprising brushes in sliding contact with the commutator for transferring electrical power to the windings, wherein the cogging torque order for the motor is greater than twenty. Preferably, the cogging torque order is 28, 36 or 44.

15 Claims, 7 Drawing Sheets

ARMATURE LAMINATIONS

CROSS-REFERENCE TO RELATED APPLICATIONS

This non-provisional patent application claims priority under 35 U.S.C. §119(a) from Patent Application No. 200710088612.0 filed in China on 16 Mar. 2007.

BACKGROUND

This invention relates to an electric motor having a wound rotor with a commutator, and in particular, to laminations for the rotor.

PRIOR ART

Wound rotors with commutators are commonly used in DC, permanent magnet motors and also in universal motors which have a wound rotor and a wound stator allowing the motor to be run in either AC or DC power.

This type of rotor has a number of salient poles about which the armature windings are wound. The windings form coils about the poles and the rotor has a number of slots which form winding tunnels through which the coils extend. The coils thus have two axially extending portions which lie within the slots and two end portions, known as heads, which extend transversely to the axial direction of either axial end of the rotor core. The heads provide no force and serve only to provide electrical connections between the axially extending portions of the coil. In most rotors, some of the heads cover or cross over other heads due to the arrangement of the coils and the winding technique. Thus, some heads must extend axially out from the rotor core a considerable distance in order to cross one, two or more preciously wound heads. This distance adds nothing to the motor performance but does add to the axial length of the motor and of course, to the total amount of wire used to form the coils.

The rotor poles are produced by making slots in the rotor core, as such, the rotor pole number is often referred to as the rotor slot number, or simply as the slot number to reduce confusion with the stator pole number, which is then referred to simply as the slot number. Thus a motor with 4 stator poles and 18 rotor poles is referred to as a 4 pole 18 slot motor. This convention will be used in this specification, where appropriate, as the number of rotor poles equals the number of winding slots in the rotor.

Thus there is a desire to reduce the cross over of the winding heads to reduce the axial length of the motor, making the motor more compact and to reduce the amount of wire used, thus saving material cost.

One way of doing this is disclosed in European patent no. EP1093208 which discloses a lamination design for a 20 slot rotor having a design in which the winding slots have various shapes giving the lamination an asymmetric configuration. This configuration allows the winding heads to lay alongside adjacent heads in the same radial plane without crossing over a previously wound head. However, while this solved the problem of reducing the axial extent of the winding heads, the 20 slot asymmetric lamination design proved, in practice, to be very difficult to implement and had a noticeable cogging torque, especially when teamed with a 4 pole stator.

The present invention aims to reduce the problems with the 20 slot asymmetric lamination. In particular, it has been found that the cogging torque can be reduced by choosing the number of rotor poles so as to form a motor with a higher cogging torque order. A higher cogging torque order results in a lower effective cogging torque. When we refer to the cogging torque order, we are really referring to the main or fundamental cogging torque order as any motor will exhibit cogging at higher harmonic frequencies and possibly some lower harmonics. It is unusual for a motor to have a single or pure cogging torque frequency but generally the harmonics will have a lower absolute value.

For example, a 20 pole rotor with a 4 pole stator has a cogging torque order of 20 and a 16 pole rotor with a 4 pole stator has a cogging torque order of 16, whereas a 14 pole rotor with a 4 pole stator has a cogging torque order of 28, an 18 pole rotor with a 4 pole stator has a cogging torque order of 36 and a 22 pole rotor with a 4 pole stator has a cogging torque order of 44. The cogging torque order can be defined as the lowest common multiple of the number of stator poles and rotor poles.

Accordingly, the present invention provides a DC motor, comprising: a stator housing accommodating a permanent magnet stator; a rotor, rotatably mounted confronting the stator, the rotor comprising a shaft, a rotor core fitted to the shaft, a commutator fitted to the shaft adjacent one end of the rotor core, windings wound about poles of the rotor core and terminated on the commutator; and brush gear comprising brushes in sliding contact with the commutator for transferring electrical power to the windings, wherein the rotor core comprises a plurality of laminations stacked together, the laminations being asymmetric, and wherein the cogging torque order for the motor is greater than twenty.

Preferably, the cogging torque order is 28, 36 or 44.

Preferably, the motor has 4 stator poles and 14, 18 or 22 rotor poles.

Preferably, the laminations have a plurality of slots formed in a radially outer periphery forming lands therebetween, the lands forming the poles of the rotor core and the slots forming winding tunnels in which the windings are received, the slots and poles being arranged in one or more sets of slots or poles, each set being identical and at least some slots of each set extend in a direction which is not purely radial and at least one slot of each set has a radial depth which is less than the radial depth of at least one of the other slots.

Preferably, each pole has a pole face defined by the radially outer surface of the rotor core, the pole faces having a circumferential extent which is substantially equal and the pole face of a first rotor pole of each set has an axially extending groove for identifying the location of a first winding to be wound.

Preferably, the groove is displaced from a circumferential centre of the pole face by a predetermined distance to create a difference in the phase of the cogging torque produced by the groove and the phase of the cogging torque produced by the first pole.

Preferably, the phase diffence is between 90 and 270 degrees.

Preferably, the phase diffence is substantially 180 degrees.

Preferably, the motor has a four pole stator and wherein the predetermined distance is an angular distance, the distance being 4.1 degrees for a 22 slot rotor, 5.0 degrees for a 18 slot rotor and 6.4 degrees for a 14 slot rotor, within a reasonable tolerance.

Preferably, the reasonable tolerance is plus or minus 1 degree.

Preferably, the motor has a four pole stator and an eighteen pole rotor, and the groove is displaced from the centre of the pole face of the first pole by a distance of between 4 and 6 degrees.

Preferably, the rotor has rotor core end protection in the form of a pair of spiders, each spider being a moulded part having a flat base having a shape corresponding to the shape of the laminations and depending walls adapted to lay against the wall of the winding tunnels at least in the region of the axial ends of the rotor core.

Preferably, at least some of the depending walls have a radially outwardly facing end and the pole face adjacent the radially outwardly facing end has a lip forming an overhang covering the otherwise exposed radially outwardly facing end.

Alternatively, each rotor pole has a pole face defined by the radially outer surface of the rotor core, the pole faces having a circumferential extent which is substantially equal and at least one pole face has an axially extending groove for identifying the location of a first winding to be wound.

Preferably, the groove 32 is displaced from a circumferential centre of the pole face 30 by a predetermined distance to create a difference in the phase of the cogging torque produced by the groove 32 and the phase of the cogging torque produced by the associated pole P1.

Preferably, the motor is a 4 pole 14 slot motor, a 4 pole 18 slot motor or a 4 pole 22 slot motor.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS

Figure 1:
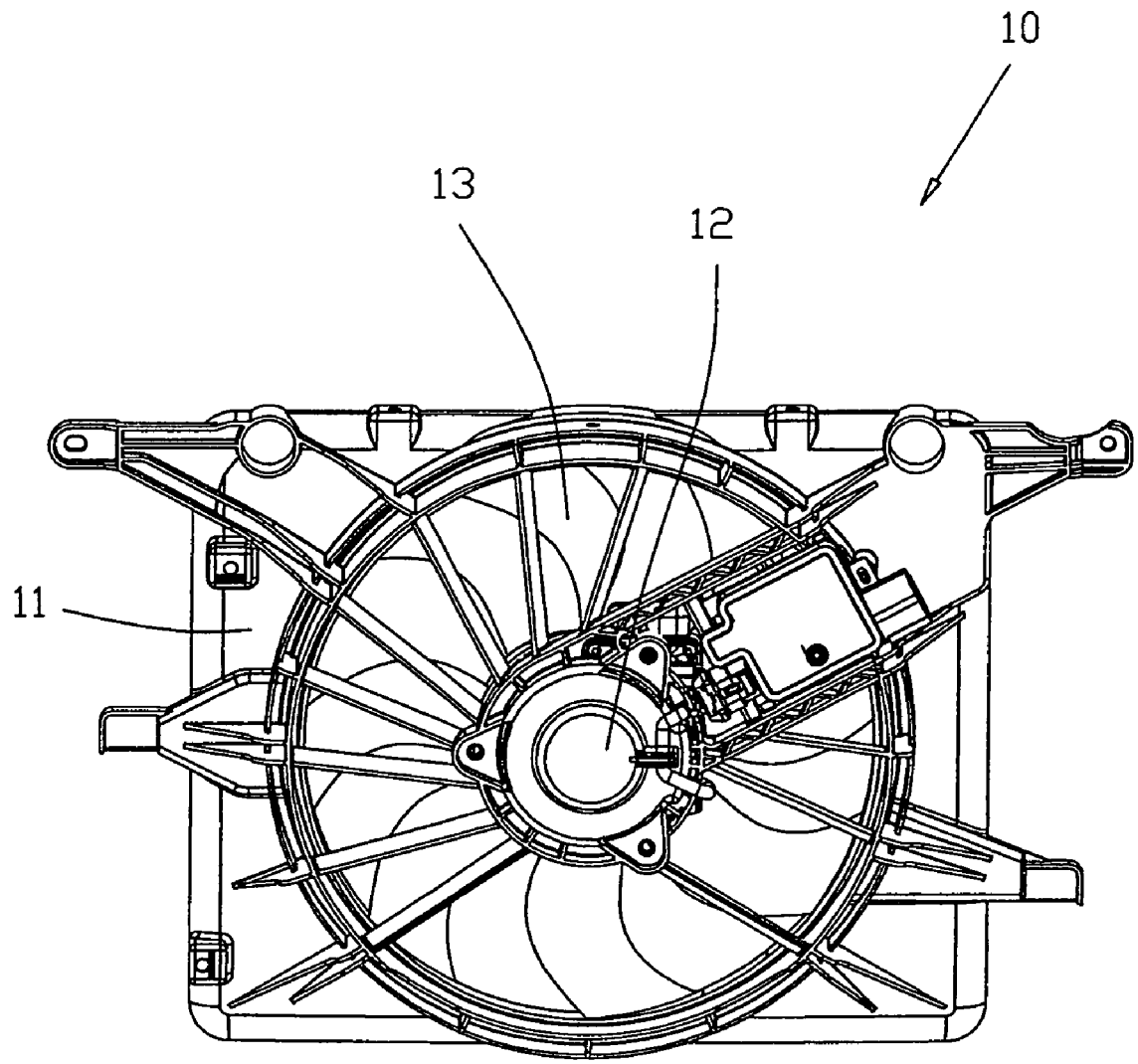
FIG. 1 illustrates a cooling fan module for a radiator of a car, incorporating a motor according to the present invention.

FIG. 1 shows a cooling fan module 10 as used for example for cooling a radiator of a vehicle. The module has a housing 11 forming a fan cowling, adapted to mate with the radiator or the like. The housing supports an electric motor 12 which drives a fan 13 for generating the flow of cooling air.

Figure 2:
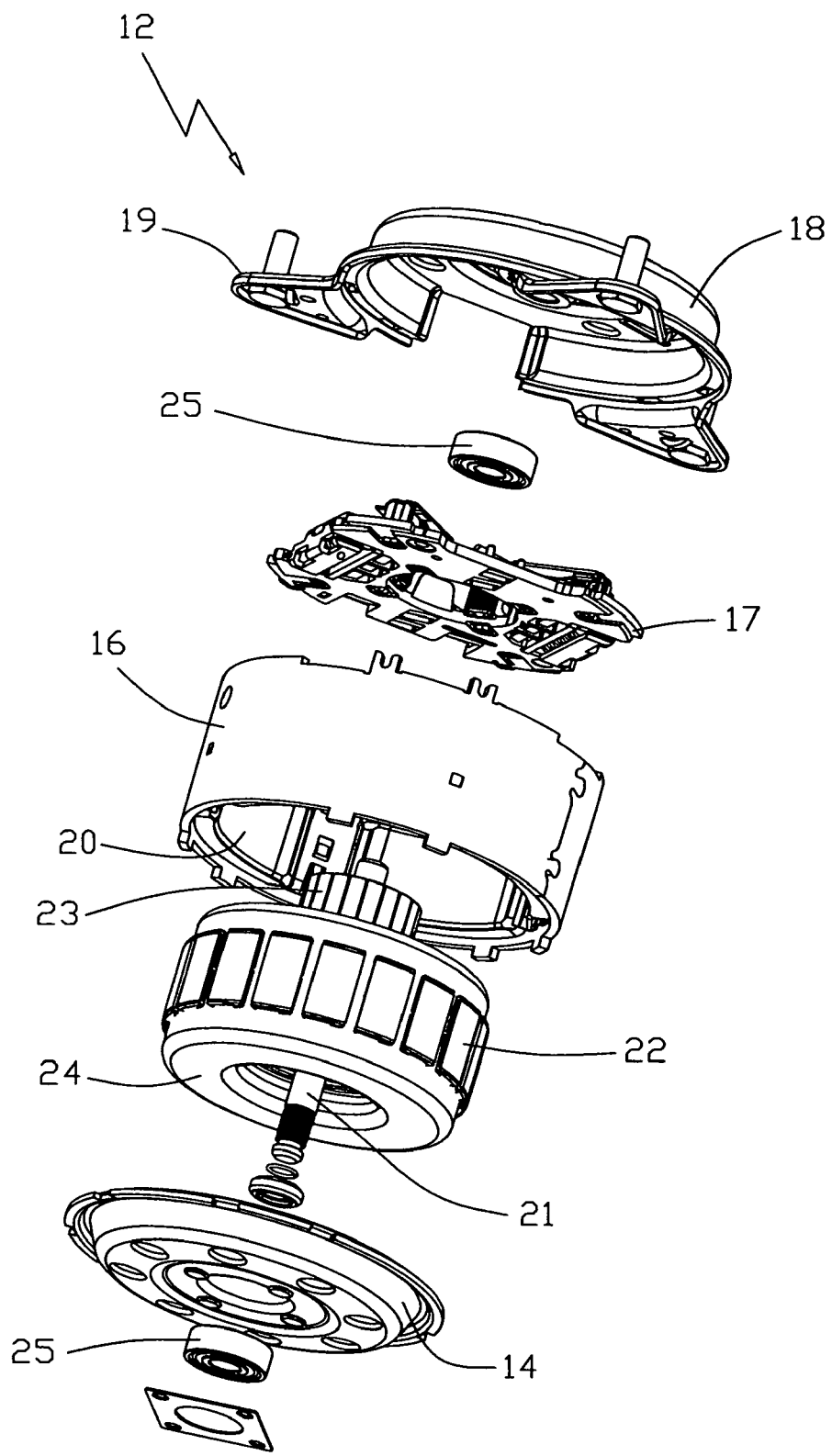
FIG. 2 is an exploded view of the motor of the cooling fan module of FIG. 1.

FIG. 2 is an exploded view of the motor 12. The motor has a first end cap 14, a rotor 15, stator housing 16, a brush card 17 and a second end cap 18, which has mounting projections 19 for fixing the motor to the module housing. The stator housing 16 supports a permanent magnet stator which, in this case, comprises four permanent magnets 20. The stator housing has open ends which are closed by the two end caps 14, 18. The rotor 15 has a shaft 21, a core 22 fitted to the shaft 21, a commutator 23 fitted on the shaft adjacent one end of the core and windings 24 wound about the poles of the core and terminated on the commutator. The rotor is mounted within the housing with the core confronting the stator and the shaft being rotatably supported in bearings 25 held by the end caps 14, 18. The shaft 21 extends through the first end cap 14 so as to engage the fan. The brush card 17 is located adjacent to and is preferably supported by the second end cap 18. The brush card 17 supports brushes slidably received in brush cages for making sliding contact with the commutator 23. In this example, there are four permanent magnets providing four stator poles and four brushes engaging the commutator.

Figure 3:
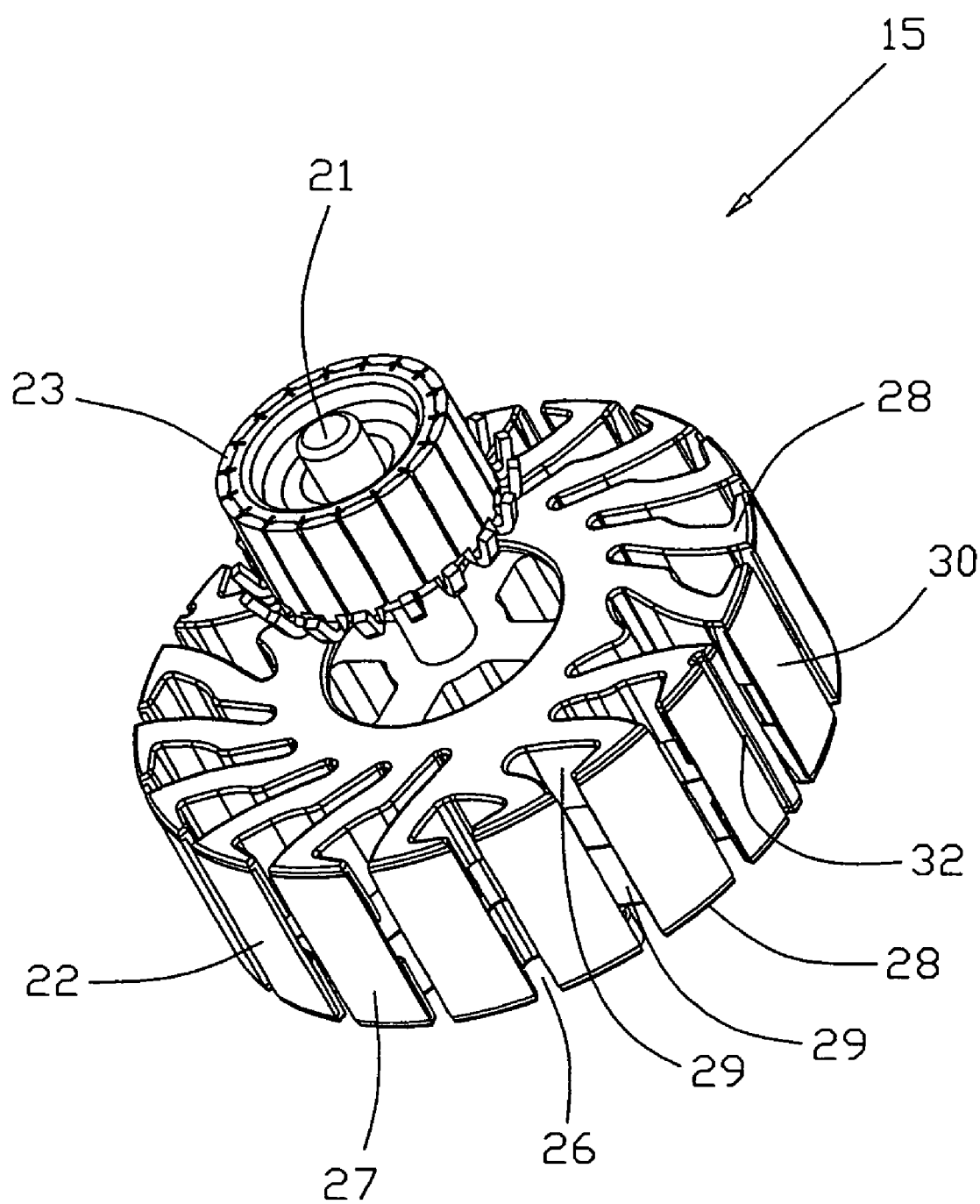
FIG. 3 is a perspective view of a rotor of the motor of FIG. 2, with the windings removed.

The rotor 15 is more clearly shown in FIG. 3, where the rotor windings have been omitted to show the structure of the core 22. In practise, the windings, which are coils of wire, are wound around poles of the core. Each coil has two axial portions and two transverse portions. The axial portions extend axially through the rotor core and are the parts of the coil which generate the electromagnetic forces to turn the rotor. In other words, they are the working part of the coil. The transverse portions extend in a direction transverse to the axis of the rotor and merely connect the axial portions. As such, they do no useful work and it is desirable to make the transverse portions as short as possible to save on wire and reduce the resistance of the coil. The transverse portions are also known as the winding heads. When the winding heads are disposed on top of one another, the axial extent can be significant and thus require a large space within the motor just to accommodate the winding heads. This adds to the material cost and also to the weight of the motor. Thus it is desirable for the heads to be as flat as possible by minimizing overlap. The rotor core 22 has a number of slots 26. The slots 26 leave lands therebetween forming the poles 27 of the rotor. Each pole has a radially outer surface, known as the pole face 30, which confronts the stator. The axial portions of the windings are accommodated or disposed within the slots 26. The rotor core 22 is formed by stacking together a number of laminations stamped from sheet metal material such as mild steel, silicon steel and stainless steel. An insulating layer, known as a spider 28, is shown located on both axial ends of the stack of laminations. Each spider 28 is made from an insulation material and is preferably an injection molded plastic part. Each spider, as shown is FIG. 10, has a flat base 34 with depending walls 29 which line the inner surface of the slots 26, at least in the region of the axial ends of the rotor core 22. The depending walls 29 of the spiders may or may not meet. The purpose of the spiders is to provide an insulating layer between the metal of the rotor core and the wire of the windings, especially on the edges of the slots of the end laminations as the edges, if left unprotected, can easily damage the relatively soft enamel insulating coating of the wires when the coils are being wound during assembly and due to vibration in use.

An alternative to the spider is an epoxy coating applied to the core before winding the coils. However, the epoxy coating is more expensive and time consuming to apply.

Figure 4:
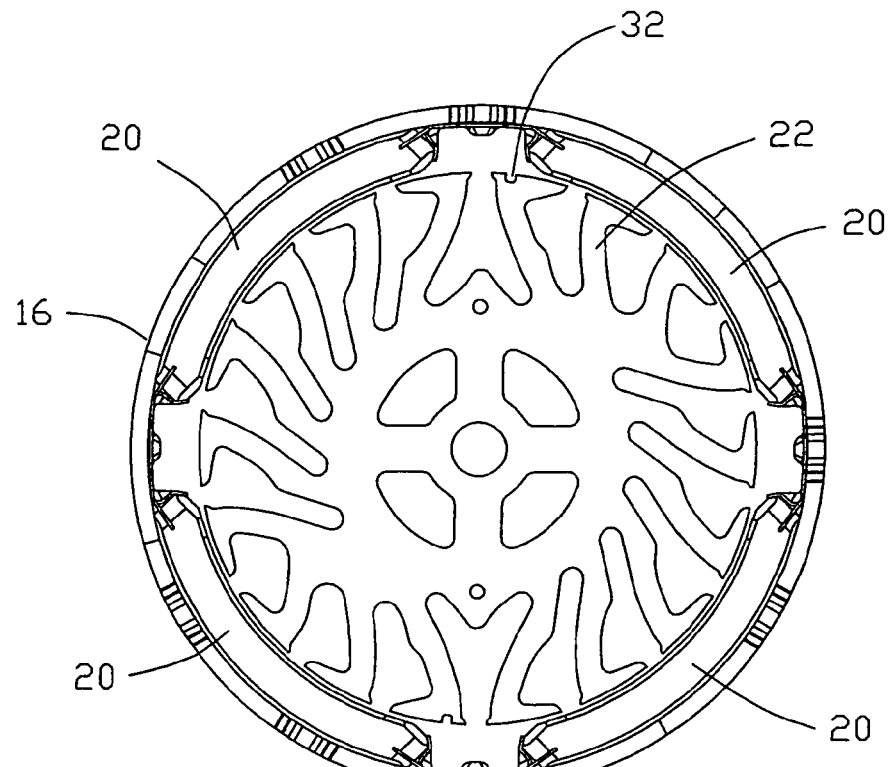
FIG. 4 is a cross sectional schematic of the motor of FIG. 2.

FIG. 4 is a cross sectional schematic of the motor, showing the stator and rotor with the windings removed to illustrate the design of the rotor core of FIG. 3. The rotor core 22, as mentioned above, is formed by stacking together a predetermined number of laminations carefully aligned, so that the slots 26 in the laminations form tunnels for the windings. This rotor 15 has a lamination known as an 18-slot asymmetric lamination as it has 18 slots 26 forming 18 poles 27 for the rotor core 22 and the slots are arranged and shaped such that the lamination is asymmetric even though the lamination can be divided into two equal halves which are identical. The slots 26 are arranged such that lay over or crossing of the winding heads is minimized, preferably a maximum of two winding heads at any location. This reduces the axial height of the winding heads. As the rotor has many poles, the windings are each wound around more than one pole, e.g., two, three or four poles, as will be explained herein after. For windings wound around a single pole, known as concentrated windings, the problem of crossed over winding heads does not occur. However, for an armature with many poles, concentrated windings are usually not a option due to the small span of the individual coils (i.e., the circumferential spacing of the axial portions of the coil) compared with the circumferential width of the stator poles, as determined by the faces of the spanned poles. This is shown schematically in FIG. 4 where the stator poles and rotor poles are shown facing across a small air gap. In the example shown, in FIG. 5, the windings have a 4-pole pitch meaning that each winding spans 4 poles, leading to an occasional overlap of the winding heads.

Figure 5:
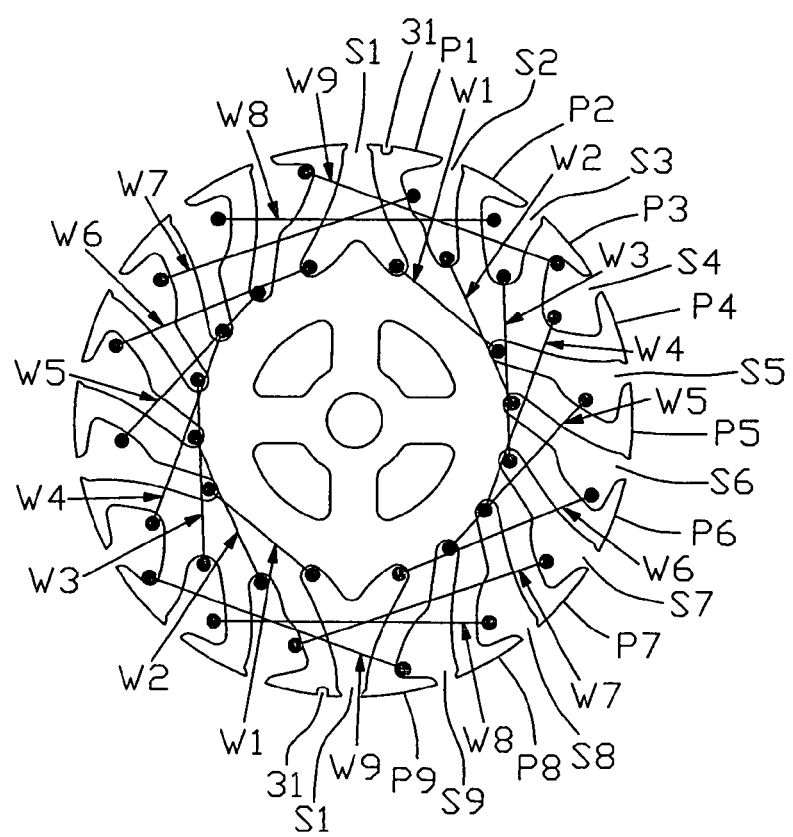
FIG. 5 is a winding schematic of the rotor of FIG. 3.

FIG. 5 illustrates the winding pattern or configuration by using lines W1 to W9 to represent the coils superimposed over an image of a lamination. The winding is preferably done by a two fly winder which means that two, diametrically opposed coils are wound at the same time. Coils W1 are wound first and are the shortest and radially innermost coils. Coils W2 are wound next and are shown to slightly overlap coils W1. Coils W3 are wound next and are shown to slightly overlap coils W2. Coils W4 are wound next and are shown not to overlap any other coil. Coils W5, and then W6 and then W7 are wound next and do not overlap any other coil. Coils W8 are wound next and are shown to overlap coils W7. Coils W9 are the last to be wound and are shown to overlap coils W7 and W8 but not at the location where W8 crosses W7, so that at any point, coils W9 are only overlapping one other coil and thus, the axial height of the winding head is kept small.

Looking closely at the lamination of FIG. 5, a small cutout 31 can be seen in two diametrically opposed pole faces. This cutout 31 forms a groove 32 in the assembled rotor core. This cutout is used as a guide for aligning the laminations in the stack and for identifying the first pole during winding. However, location of this cutout is important as will be explained hereinafter.

The lamination has 18 slots 26 forming 18 poles. Each pole has a pole face which has a substantially equal circumferential extend. However, the slots 26 are not all identical. The slots can be divided into two sets of 9 slots, each set being identical. Slot 1, the slot in which coil W1 starts has a maximum radial depth. The next 3 slots, 2, 3 and 4, have progressively reducing radial depths, the remaining slots, 5 to 9, have a maximum radial depth and similar shapes. However, each of the slots are adapted to have two distinct locations for the coils as each slot receives the axial portions of two different coils. This is to position the coils at desired radial depths within the slots to attain the desired placement of the coils.

The cutout 31 is necessary to identify the first pole when winding the coils. However, the location of the cutout on the pole face does have an effect on the cogging torque produced by the first pole. Should the cutout be located at the center of the pole face, the cogging torque produced by the cutout and by the pole itself would be in phase and the two cogging torques would be added together giving a resultant cogging torque of increased magnitude.

However, if the cutout is shifted, the cogging torques will not be in phase and the magnitude of the resultant cogging torque is no longer simply the addition of the magnitude of the two cogging torques. By shifting the cutout, so that the cogging torque due to the cutout is 180° out of phase with the cogging torque of the pole, the cutout cogging torque can partially offset or reduce the cogging torque of the pole, resulting in an overall reduction in cogging torque for the rotor.

Therefore, for a 4 pole (4 stator poles), 18 slot (18 rotor poles) motor as shown, the 180° phase difference is achieved by moving the cutout by 5.0° from the center of the pole face. Tolerance allows variations within ±1°. However, phase differences of between 90° and 270° may have a beneficial effect on the cogging torque by not increasing it.

Looking at the slots in FIG. 5, it can be seen that only slot S4 could be described as being radially converging. However, the other slots in each group are inclined towards the radial line of slot S4. Even slot S1, which is symmetrical about its radial line, can be seen to be extending inwardly towards the radial line of slot S4. This inclining of the slots allows the width of the coils to be reduced compared to a core having radially convergent slots.

Figure 6:
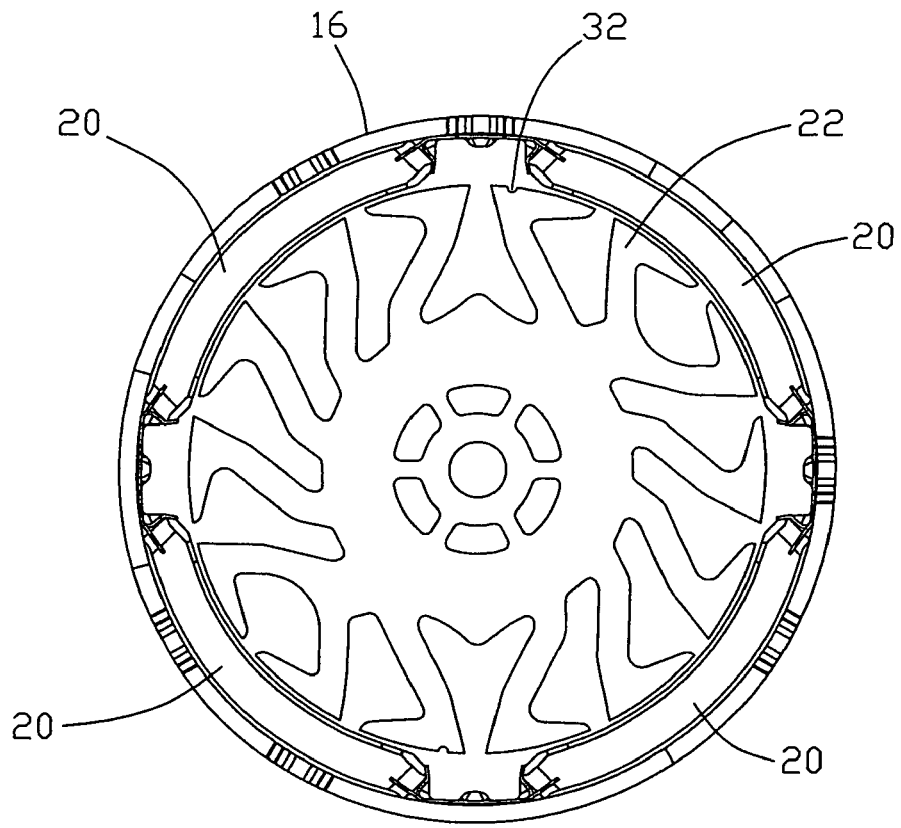
FIG. 6 is a cross sectional schematic, similar to FIG. 4, of a modified rotor.
Figure 7:
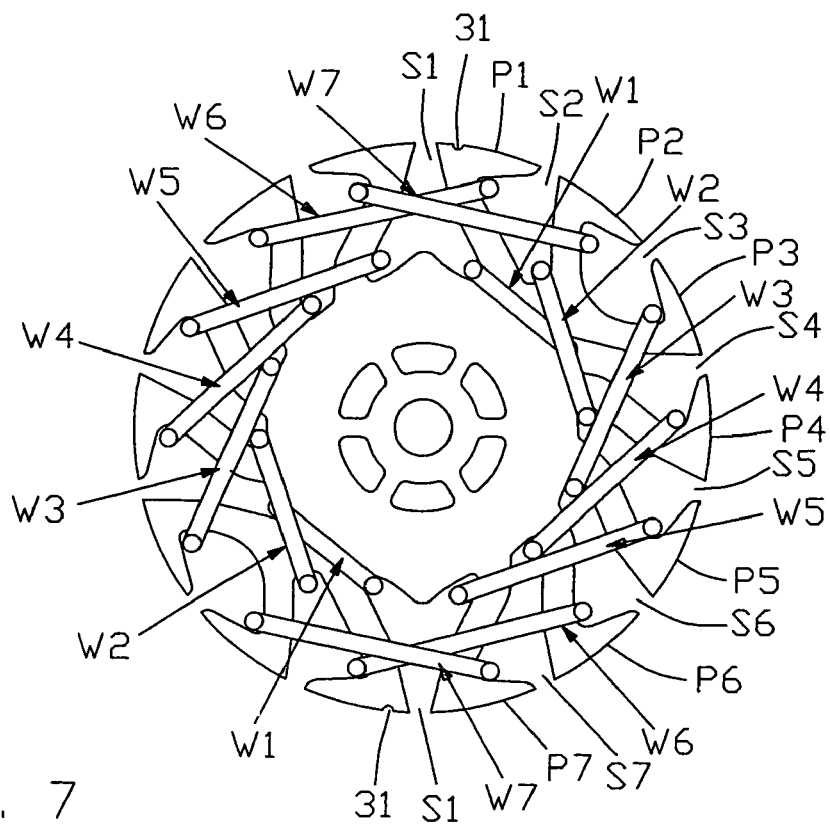
FIG. 7 is a winding schematic of the rotor of FIG. 6.

FIGS. 6 and 7 illustrate another embodiment of the present invention. The motor is a 4 pole (4 stator poles) 14 slot (14 rotor poles) motor. This gives a cogging torque of 28. The 180° phase shift for the cutout 31 is achieved by a shift of 6.4±1 degrees from the center of the pole face.

As shown in FIG. 7, coil W1, which is the first coil to be wound, is slightly overlapped by coil W2, the second coil to be wound. Also, coil W7 overlaps coil W6. The remaining coils are substantially overlap free, resulting in a very low winding head profile. The pole span by the coils, in this example, is three poles. Again, the slots and coils are arranged in two identical sets of seven. Slot S1 has the greatest radial depth and slot S3 has the least radial depth with slot S2 having a radial depth in between. Slots S4 to S7 are substantially identical and have a radial depth similar to that of slot S1.

Figure 8:
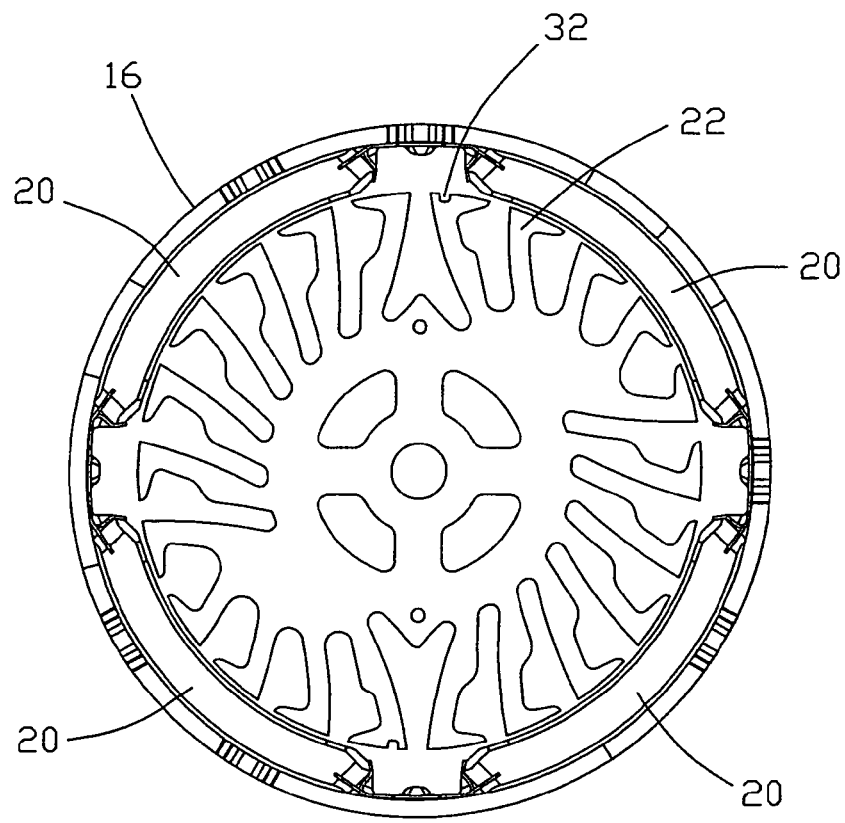
FIG. 8 is a cross sectional schematic, similar to FIG. 4, of a further modified rotor.
Figure 9:
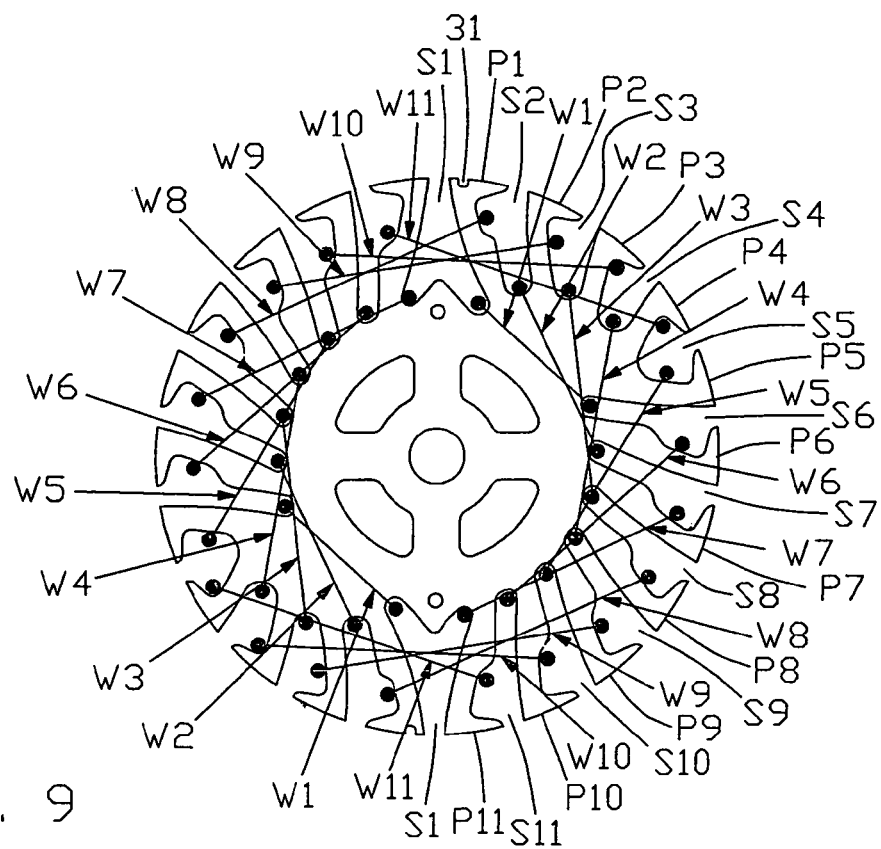
FIG. 9 is a winding schematic of the rotor of FIG. 8.

FIGS. 8 and 9 illustrate a third embodiment of the present invention. In this example, the motor is a 4 pole (4 stator poles) 22 slot (22 rotor poles) motor. This gives a cogging torque order of 44. The 180° phase shift for the cogging torque of the groove 32 is achieved by a shift of 4.1±1 degrees from the center of the pole face.

As shown in FIG. 9, there is again 2 sets of slots and coils (1 to 11). Coil W1 is wound first extending from slot S1 to slot S6. Thus the coils span five poles (P1 to P5). The remaining coils are wound in sequence from W2 to W11. Overlapping is more problematic as the pole span increases but even with this five pole span arrangement, the axial height of the winding head is small and coil crossings have been limited to a maximum of three coils at any one position.

In this example, slot S1 has the greatest radial depth and slot S5 has the least radial depth. Slots S2 to S4 have progressively shorter radial depths. Slots S6 to S11 are substantially identical and have radial depths similar to slot S1. Slots S1 to S4 and slots S6 to S8 are inclined towards the radial line of slot S5, at their radially inner ends.

Figure 10:
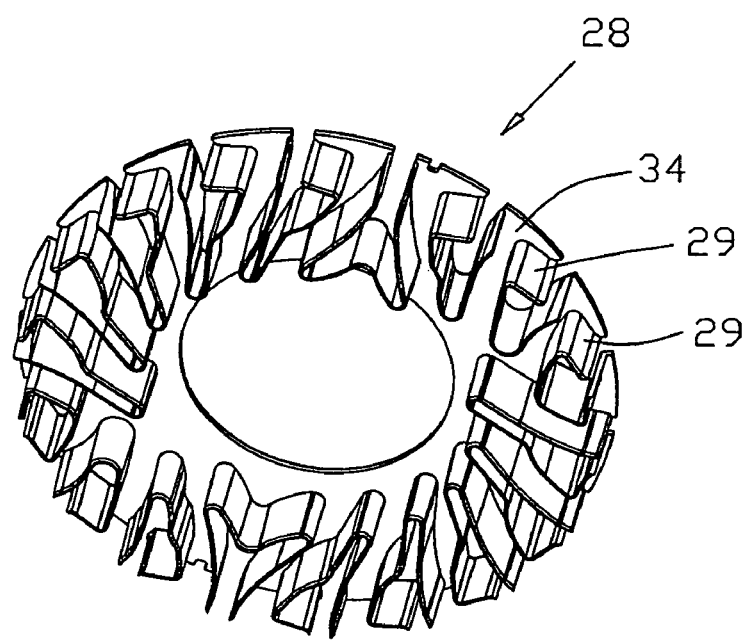
FIG. 10 is a perspective view of a spider as used in the rotor of FIG. 3.

FIG. 10 is a perspective view of one of the spiders 28. Spider 28 has a flat base 34, which is substantially similar to the shape of the laminations which the spider overlays. The central hole of the spider is larger than that of the laminations. The depending walls 29 extend from the edge of the slot regions so as to line or lay against the walls of the winding tunnels.

Figure 11:
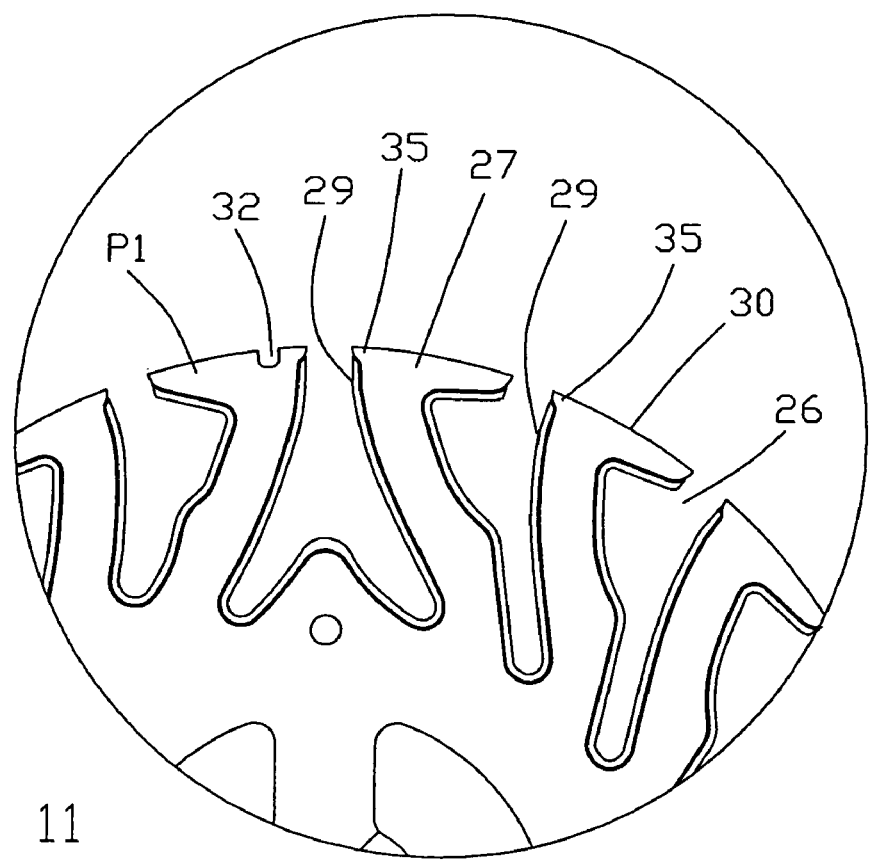
FIG. 11 is an enlarged view of a portion on the rotor core and spider.

FIG. 11 schematically illustrates a portion of one of the spiders 28 and the rotor core 22 on a larger scale. The depending walls 29 have two ends which extend in the axial direction. Some of these ends are facing radially outwardly while others face circumferentially. Here it can be seen that although each pole on one side thereof seems to extend directly from the pole face, there is a small overhang, formed by lip 35, which covers the otherwise exposed radially outwardly facing end of the depending wall. The other side of the pole has a large overhang which covers the other end of an adjacent depending wall. Due to the arrangement of the poles, the depending wall of slot S1 has two radially outwardly facing ends while the depending wall of slot S4 has two circumferentially facing ends.

The purpose of the lip 35 is to prevent wire from a coil being accidentally caught between the depending wall of the spider and the rotor core, during winding of the coil. Hence the design of this rotor core is adapted to be suitable for use with spiders, for core end protection and slot insulation.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the invention is described with reference to a preferred embodiment, it will occur to persons of the art that various modifications are possible. Therefore, the scope of the invention is to be determined only by reference to the claims that follow.

The invention claimed is:

1. A DC motor, comprising:
a stator housing accommodating a permanent magnet stator;
a rotor, rotatably mounted confronting the stator, the rotor comprising a shaft, a rotor core fitted to the shaft, a commutator fitted to the shaft adjacent one end of the rotor core, windings wound about poles of the rotor core and terminated on the commutator; and brush gear comprising brushes in sliding contact with the commutator for transferring electrical power to the windings,
wherein the rotor core comprises a plurality of laminations stacked together, the laminations being asymmetric, and the motor has a fundamental cogging torque order that is greater than twenty.

2. The motor of claim 1, wherein the fundamental cogging torque order is 28, 36 or 44.

3. The motor of claim 1, wherein the laminations have a plurality of slots formed in a radially outer periphery forming lands therebetween, the lands forming the poles of the rotor core and the slots forming winding tunnels in which the windings are received, the slots and rotor poles being arranged in one or more sets of slots and rotor poles, each set being identical and at least some slots of each set extend in a direction which is not purely radial and at least one slot of each set has a radial depth which is less than the radial depth of at least one of the other slots.

4. The motor of claim 3, wherein each rotor pole has a pole face defined by the radially outer surface of the rotor core, the pole faces having a circumferential extent which is substantially equal and the pole face of a first one of the rotor poles P1 of each set has an axially extending groove for identifying the location of a first one of the windings to be wound.

5. The motor of claim 4, wherein the groove is displaced from a circumferential centre of the pole face by a predetermined distance to create a difference in the phase of the cogging torque produced by the groove and the phase of the cogging torque produced by the first pole P1.

6. The motor of claim 5, wherein said phase difference is between 90 and 270 degrees.

7. The motor of claim 5, wherein the phase difference is substantially 180 degrees.

8. The motor of claim 5, wherein the motor has a four pole stator and wherein the predetermined distance is an angular distance, the distance being 4.1 degrees for a 22 slot rotor, 5.0 degrees for a 18 slot rotor and 6.4 degrees for a 14 slot rotor, within a reasonable tolerance.

9. The motor of claim 8, wherein the reasonable tolerance is plus or minus one degree.

10. The motor of claim 5, wherein the motor has a four pole stator and an eighteen pole rotor, and the groove is displaced from the centre of the pole face of the first pole P1 by a distance of between four and six degrees.

11. The motor of claim 1, wherein the rotor has rotor core end protection in the form of a pair of spiders, each spider being a moulded part having a flat base having a shape corresponding to the shape of the laminations and depending walls adapted to lay against the wall of the winding tunnels at least in the region of the axial ends of the rotor core.

12. The motor of claim 11, wherein at least some of the depending walls have a radially outwardly facing end and the pole face adjacent the radially outwardly facing end has a lip forming an overhang covering the otherwise exposed radially outwardly facing end.

13. The motor of claim 1, wherein each rotor pole has a pole face defined by the radially outer surface of the rotor core, the pole faces having a circumferential extent which is substantially equal and at least one pole face has an axially extending groove for identifying the location of a first winding to be wound.

14. The motor of claim 13, wherein the groove is displaced from a circumferential centre of the pole face by a predetermined distance to create a difference in the phase of the cogging torque produced by the groove and the phase of the cogging torque produced by the associated pole P1.

15. The motor of claim 1, wherein the motor is a 4 pole 14 slot motor, a 4 pole 18 slot motor or a 4 pole 22 slot motor.

* * * * *